(12) United States Patent  (10) Patent No.: US 7,610,428 B2
Barron, Jr. et al.  (45) Date of Patent: Oct. 27, 2009

(54) SYSTEM FOR PROVIDING A COMMUNICATION INTERFACE

(75) Inventors: Matthew Darrell Barron, Jr., Houston, TX (US); Todd Delton Grabbe, Sugarland, TX (US)

(73) Assignee: Augmentix Corporation, Austin, TX (US)

( * ) Notice: Subject to any disclaimer, the term of this patent is extended or adjusted under 35 U.S.C. 154(b) by 315 days.

(21) Appl. No.: 11/324,732

(22) Filed: Dec. 30, 2005

(65) Prior Publication Data

US 2007/0174466 A1    Jul. 26, 2007

(51) Int. Cl.
*H05K 7/10* (2006.01)

(52) U.S. Cl. .................. 710/301; 710/36; 710/62; 710/300; 710/303; 710/104

(58) Field of Classification Search .................. 710/36, 710/62, 300, 301, 303, 104
See application file for complete search history.

(56) References Cited

U.S. PATENT DOCUMENTS

| 7,308,521 | B1* | 12/2007 | Sutardja | 710/305 |
| 2005/0006483 | A1* | 1/2005 | Fruhauf | 235/492 |
| 2005/0182882 | A1* | 8/2005 | Chu | 710/301 |
| 2006/0062030 | A1* | 3/2006 | Keller | 363/78 |
| 2006/0190669 | A1* | 8/2006 | Lee et al. | 711/4 |

* cited by examiner

*Primary Examiner*—Tariq Hafiz
*Assistant Examiner*—Jasjit S Vidwan
(74) *Attorney, Agent, or Firm*—Sprinkle IP Law Group

(57) ABSTRACT

A system, providing a communication interface, is provided. The system includes an embedded device and a host. The embedded device includes an Ethernet controller that is connected to a communication bus on the host. The host includes device drivers of the Ethernet controller. Therefore, no special host-side software is required to establish the communication between the embedded device and the host.

34 Claims, 2 Drawing Sheets

SYSTEM FOR PROVIDING A COMMUNICATION INTERFACE

BACKGROUND

The present invention relates generally to computer networks. More specifically, it relates to a system for providing a communication interface between an embedded device and a host to which the embedded device is attached.

A computer can communicate with various embedded devices, such as add-on Peripheral Component Interconnect (PCI) cards, and the like. A computer to which an embedded device is attached is hereinafter referred as a host. A communication interface between an embedded device and a host is provided by a device driver of the embedded device, which has to be installed on the host. In existing techniques, the communication interface between the embedded device and the host is a register-based, proprietary PCI bridge interface. Protocols used for controlling such register-based, embedded devices are device dependent. All register interaction and control protocols required to operate the embedded device must be specified. This may also require documentation explaining the manipulation of the device registers.

Further, different device drivers are required for different Operating Systems (OSs). It is possible that a device driver for a particular OS is incompatible with a host with a certain hardware configuration. This, in turn, increases the development cost of such embedded devices.

In light of the foregoing discussion, there exists a need for a system that provides a communication interface between an embedded device and a host. The system needs to provide a communication interface that does not require special host-side software.

SUMMARY

The present invention provides a system for providing a communication interface. An object of the present invention is to provide an embedded device that is capable of communicating with a host to which the embedded device is attached.

Another object of the present invention is to provide an embedded device that does not require special host-side software to establish communication between the embedded device and the host. This reduces the development cost.

Yet another object of the present invention is to provide electrical isolation between the embedded device and the host. The electrical isolation enables the access of the embedded device even when the host is switched off.

In order to achieve the foregoing objectives, and in accordance with the purpose of the various embodiments of the present invention as broadly described herein, the present invention provides a system for providing a communication interface. The system includes an embedded device and a host to which the embedded device is attached. The embedded device includes an Ethernet controller for communicating with the host. The host includes device drivers of the Ethernet controller. Therefore, no special host-side software is required to establish communication between the embedded device and the host.

The embedded device has a power supply of its own. Therefore, it can operate even when the host's power supply is switched off. The embedded device also includes an electrical isolation medium that is capable of electrically isolating the embedded device from the host.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DESCRIPTION OF VARIOUS EMBODIMENTS

Embodiments of the present invention provide systems that provide a communication interface between an embedded device and a host. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail, in order to avoid obscuring aspects of embodiments of the present invention.

Embodiments of the present invention provide an embedded device that is capable of communicating with a host to which it is attached. This embedded device includes an Ethernet controller that enables communication between the embedded device and the host. In accordance with various embodiments of the present invention, this embedded device is an add-on Peripheral Component Interconnect (PCI) card.

Figure 1:
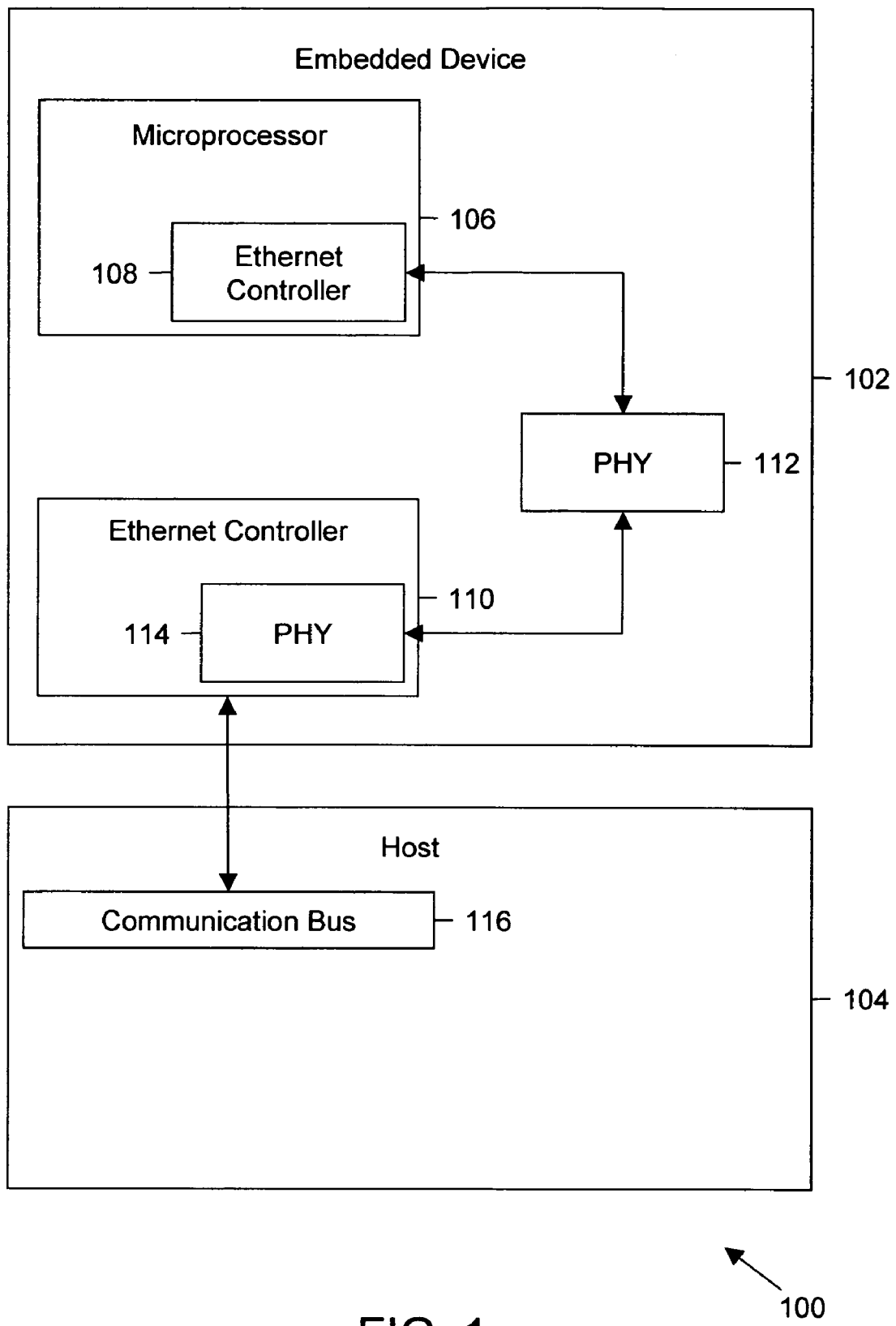
FIG. 1 illustrates various elements of a system for providing a communication interface, in accordance with an embodiment of the present invention.

FIG. 1 illustrates various elements of a system 100 for providing a communication interface, in accordance with an embodiment of the present invention. System 100 includes an embedded device 102 and a host 104. In accordance with various embodiments of the present invention, embedded device 102 is attached to host 104. In accordance with an embodiment of the present invention, host 104 is a network device on a network. Network devices may be, for example, personal computers, servers, mobiles, etc.

In accordance with various embodiments of the present invention, embedded device 102 includes a microprocessor 106. Microprocessor 106 includes a first Ethernet controller 108, in accordance with an embodiment of the present invention. Embedded device 102 also includes a memory and various Input/Output (I/O) devices connected to microprocessor 106, in accordance with various embodiments of the present invention. Therefore, various applications can run on microprocessor 106. Host 104 includes a Central Processing Unit (CPU), in accordance with various embodiments of the present invention. Host 104 also includes a memory and various I/O devices associated with the CPU, in accordance with various embodiments of the present invention. Therefore, various applications can run on the CPU in host 104.

Embedded device 102 includes a second Ethernet controller 110 for providing communication between embedded device 102 and host 104, in accordance with various embodiments of the present invention. Embedded device 102 includes a first Physical layer (PHY) 112 to provide a physical interface between microprocessor 106 and second Ethernet controller 110, in accordance with various embodiments of the present invention. First PHY 112 is connected to first Ethernet controller 108 through a physical transmission medium. First PHY 112 is also connected to a second PHY 114, which is included in second Ethernet controller 110, through a physical transmission medium. In accordance with various embodiments of the present invention, the physical transmission medium is a trace. In this way, the connection between microprocessor 106 and second Ethernet controller 110 is established. Further, embedded device 102 also includes a local device driver to provide a communication interface between second Ethernet controller 110 and a local OS running on microprocessor 106.

Second Ethernet controller 110 is connected to a communication bus 116 included in host 104, in accordance with various embodiments of the present invention. Examples of communication bus 116 include, but are not limited to, a PCI bus, a PCI extended (PCI-X) bus, and a PCI Express bus. Second Ethernet controller 110 interfaces with communication bus 116, and communicates with the Ethernet signals of microprocessor 106. Therefore, applications running on microprocessor 106 can communicate with applications running on host 104. In accordance with various embodiments of the present invention, these applications communicate with each other by using various Internet protocols, such as Transmission Control Protocol/Internet Protocol (TCP/IP), User Datagram Protocol/IP (UDP/IP), HyperText Transfer Protocol (HTTP), and Network File System (NFS) protocol.

In accordance with various embodiments of the present invention, embedded device 102 includes a power supply module, which provides a power supply to embedded device 102. Therefore, embedded device 102 can operate even when the power supply of host 104 is switched off. However, to prevent damage to improperly biased interface devices, embedded device 102 and host 104 need to be electrically isolated from each other. To achieve this electrical isolation, embedded device 102 includes an electrical isolation medium, in accordance with various embodiments of the present invention. In accordance with various embodiments of the present invention, the electrical isolation medium includes an isolation transformer. The isolation transformer is a transformer device that couples the Ethernet signals of host 104 with the Ethernet signals of microprocessor 106.

Further, embedded device 102 can also include a storage medium for storing data, in accordance with various embodiments of the present invention.

In accordance with an embodiment of the present invention, embedded device 102 can include an Ethernet connector, which provides a connection to an Ethernet network. Therefore, embedded device 102 can act as a network device on the Ethernet network, and can be accessed from remote locations.

Furthermore, in accordance with an embodiment of the present invention, embedded device 102 can provide information about the availability of host 104, when accessed from a remote location on the Ethernet network. For this purpose, embedded device 102 includes an instrumentation processor, in accordance with an embodiment of the present invention. This instrumentation processor collects information about the availability of host 104, and transmits this information to microprocessor 106. In accordance with an embodiment of the present invention, the instrumentation processor is a micro-controller.

In accordance with various embodiments of the present invention, host 104 includes device drivers to communicate with second Ethernet controller 110. Second Ethernet controller 110 provides a communication interface between embedded device 102 and host 104. Therefore, host 104 communicates directly through second Ethernet controller 110, and therefore, requires only the device drivers of second Ethernet controller 110. It should be noted that these device drivers are known in the art and are available for existing Operating Systems (OSs). Further, even in the case of an OS, various versions of device drivers are known in the art, which are compatible with various host architectures. Therefore, no special host-side software is required to establish the communication between embedded device 102 and host 104. In accordance with various embodiments of the present invention, embedded device 102 is compatible with the existing OSs and the existing host architectures.

In accordance with various embodiments of the present invention, first Ethernet controller 108 may be a part of embedded device 102, without being included in microprocessor 106. In accordance with various embodiments of the present invention, second PHY 114 may be a part of embedded device 102, without being included in second Ethernet controller 110. Therefore, embedded device 102 can include microprocessor 106, first ethernet controller 108, second ethernet controller 110, first PHY 112 and second PHY 114, as illustrated in FIG. 2.

Figure 2:
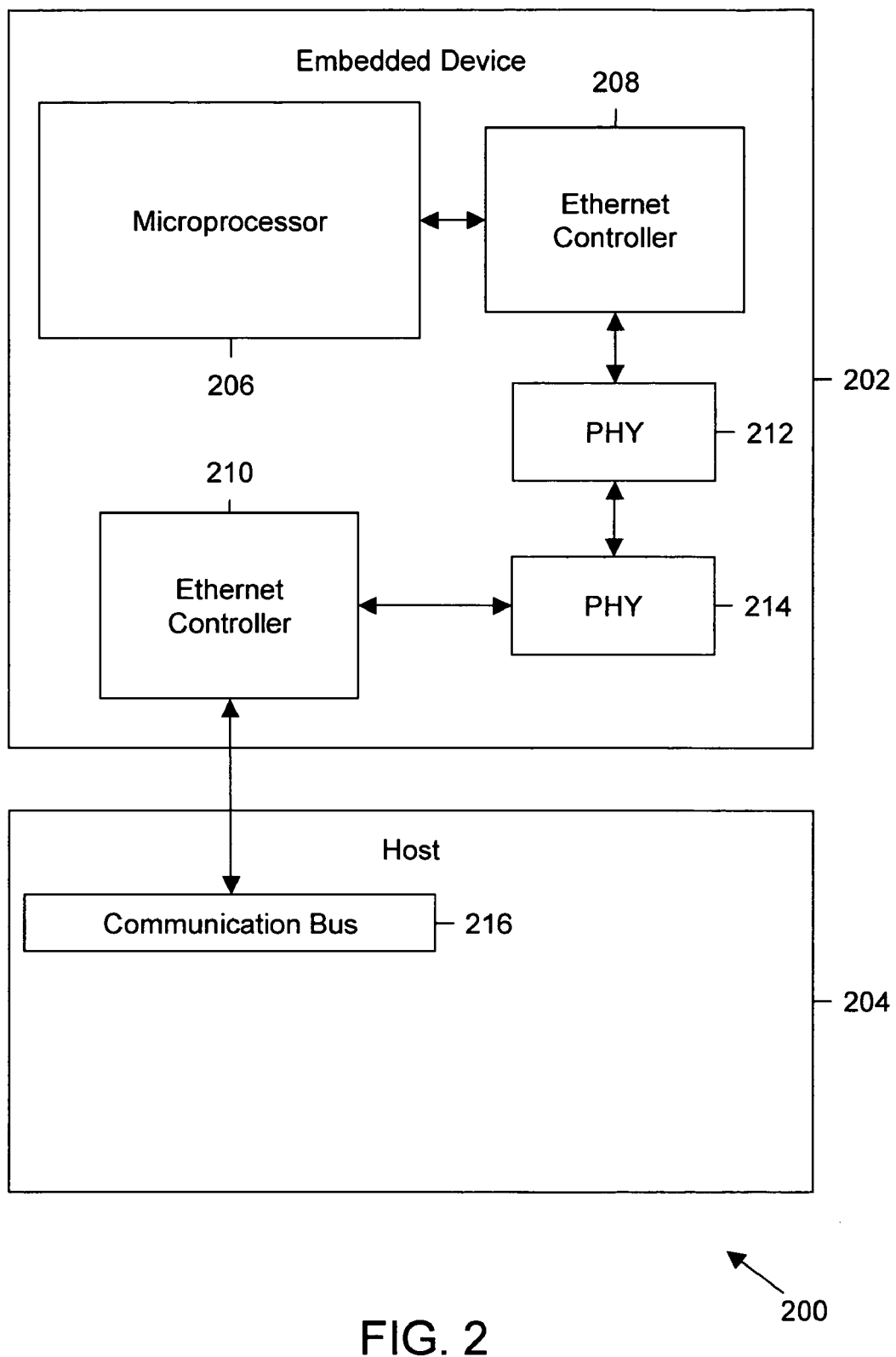
FIG. 2 illustrates various elements of a system for providing a communication interface, in accordance with another embodiment of the present invention.

FIG. 2 illustrates various elements of a system 200 for providing a communication interface, in accordance with another embodiment of the present invention. System 200 includes an embedded device 202 and a host 204. Embedded device 202 includes a microprocessor 206, a first Ethernet controller 208, a second Ethernet controller 210, a first PHY 212 and a second PHY 214. Further, second Ethernet controller 210 is connected to a communication bus 216 included in host 204. Various functions of and connections between the various elements of system 200 are the same as that of system 106 explained above in conjunction with FIG. 1.

In accordance with various embodiments of the present invention, host 104 communicates with embedded device 102 through second Ethernet controller 110. Therefore, there is no need for any special host-side software. The only requirement is that host 104 should be configured to communicate with second Ethernet controller 110. No other special host-side configuration is required. If host 104 is configured to communicate through second Ethernet controller 110, the communication between embedded device 102 and host 104 is established. This makes embedded device 102 compatible with the existing OSs and the existing host architectures.

Various embodiments of the present invention provide an Ethernet-based communication interface between embedded device 102 and host 104. Therefore, applications running on embedded device 102 can communicate with applications running on host 104, using various Internet protocols, such as TCP/IP, UDP/IP, HTTP, and NFS protocol.

In accordance with various embodiments of the present invention, embedded device 102 includes a power supply of its own. Therefore, it can operate even when the power supply of host 104 is switched off. Various embodiments of the present invention provide an electrical isolation between embedded device 102 and host 104. This protects embedded device 102 from any possible damage.

Various embodiments of the present invention provide a physical connection between embedded device 102 and an Ethernet network through Ethernet connectors. Therefore, embedded device 102 can be accessed from remote locations.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the acts constituting the method of the present invention.

The computer system comprises a computer, an input device, a display unit, the Internet, and a microprocessor. The microprocessor is connected to a communication bus. The computer also comprises a memory, which may include a Random Access Memory (RAM) and a Read Only Memory (ROM). The computer system also comprises a storage device, which can be a hard disk drive or a removable storage drive, such as a floppy disk drive, an optical disk drive, a flash memory, and so forth. The storage device can also be other similar means for loading computer programs or other instructions into the computer system.

The computer system executes a set of instructions that are stored in one or more storage elements, in order to process input data. These storage elements may also hold data or other information, as desired, and may also be in the form of an information source or a physical memory element in the processing machine.

The set of instructions may include various commands instructing the processing machine to perform specific tasks, such as the acts constituting the method of the present invention. The set of instructions may be in the form of a software program, and the software may be in various forms, such as system software or application software. Further, the software may be in the form of a collection of separate programs, a program module with a larger program, or a portion of a program module. The software may also include modular programming in the form of object-oriented programming. The processing of input data by the processing machine may be in response to user commands, to results of previous processing, or in response to a request made by another processing machine.

While various embodiments of the present invention have been illustrated and described, it will be clear that the present invention is not limited only to these embodiments. Numerous modifications, changes, variations, substitutions and equivalents will be apparent to those skilled in the art, without departing from the spirit and scope of the present invention, as described in the claims.

What is claimed is:

1. A system comprising:
   a. an embedded device, the embedded device comprising:
      i. a microprocessor, the microprocessor comprising a first Ethernet controller;
      ii. a first Physical layer (PHY), wherein the first PHY is coupled to the first Ethernet controller through a physical transmission medium;
      iii. a second Ethernet controller, the second Ethernet controller comprising a second PHY, wherein the second PHY is coupled to the first PHY through a physical transmission medium on the embedded device, wherein the first Ethernet controller, the first PHY the second PHY and the second Ethernet controller form a network on the embedded device;
      iv. an electrical isolation medium; and
      v. an interface operable to be physically coupled to a communication bus; and
      vi. Power supply module, the power supply module providing a power supply to the embedded device.
   b. a host, the host comprising the communication bus, wherein the interface of the embedded device is physically coupled to the communication bus, the host and the embedded device are electrically isolated from one another by the electrical isolation medium, the communication bus is coupled to the second Ethernet controller and the host is configured to communicate with the embedded device through the second Ethernet controller using only device drivers included with an operating system running on the host.

2. The system of claim 1, wherein the communication bus comprises one or more of a Peripheral Component Interconnect (PCI) bus, a PCI extended (PCI-X) bus, and a PCI Express bus.

3. The system of claim 1, wherein the embedded device further comprises:
   a. a memory, the memory being coupled with the microprocessor; and
   b. one or more Input/Output (I/O) devices, the one or more I/O devices being couple with the microprocessor.

4. The system of claim 1, wherein the embedded device further comprises an Ethernet connector, the Ethernet connector providing a physical connection between the embedded device and an Ethernet network.

5. The system of claim 4, wherein the embedded device is accessible from a remote host on the Ethernet network.

6. The system of claim 1, wherein the microprocessor further comprises one or more applications, wherein the one or more applications are used for communicating with applications running on the host.

7. The system of claim 1, wherein the embedded device further comprises an instrumentation processor, the instrumentation processor collecting information about the host, the instrumentation processor transmitting the information to the microprocessor.

8. The system of claim 7, wherein the instrumentation processor comprises a micro-controller.

9. The system of claim 1, wherein the embedded device further comprises a storage medium, the storage medium being capable of storing data.

10. An embedded device for communicating with a host, the embedded device comprising:
    a. a microprocessor, the microprocessor comprising a first Ethernet controller;
    b. an electrical isolation medium
    c. a first Physical layer (PHY), wherein the first PHY is coupled to the first Ethernet controller through a physical transmission medium; and
    d. a second Ethernet controller, the second Ethernet controller comprising a second PHY, where the second PHY is coupled to the first PHY through a physical transmission medium on the embedded device, wherein the first Ethernet controller, the first PHY the second PHY and the second Ethernet controller form a network on the embedded device and the second Ethernet controller is coupled to a communication bus comprised in the host through an interface physically coupled to the communication bus, wherein the host and the embedded device are electrically isolated from one another by the electrical isolation medium and the host is configured to communicate with the embedded device through the second Ethernet controller using only device drivers included with an operating system running on the host
    e. Power supply module, the power supply module providing a power supply to the embedded device.

11. The embedded device of claim 10 further comprising:
    a. a memory, the memory being coupled with the microprocessor; and
    b. one or more Input/Output (I/O) devices, the one or more I/O devices being coupled with the microprocessor.

12. The embedded device of claim 10, wherein the microprocessor further comprises one or more applications, where the one or more applications are used for communicating with applications running on the host.

13. The embedded device of claim 10 further comprising an Ethernet connector, the Ethernet connector providing a physical connection between the embedded device and an Ethernet network.

14. The embedded device of claim 13 is accessible from a remote host on the Ethernet network.

15. A system comprising:
an embedded device, the embedded device comprising:
a microprocessor, the microprocessor comprising a first Ethernet controller;
an electrical isolation medium;
an interface operable to be physically coupled to a communication bus;
a first Physical layer (PHY), wherein the first PHY is coupled to the first Ethernet controller through a physical transmission medium; and
a second Ethernet controller, the second Ethernet controller comprising a second PHY, wherein the second PHY is coupled to the first PHY through a physical transmission medium on the embedded device such that the first Ethernet controller, the first PHY the second PHY and the second Ethernet controller form a network on the embedded device; and
an instrumentation processor, the instrumentation processor collecting information about the host, the instrumentation processor transmitting the information to the microprocessor; and
a host, the host comprising the communication bus, wherein the interface of the embedded device is physically coupled to the communication bus, the host is electrically isolated from the embedded device by the electrical isolation medium the communication bus is couple to the second Ethernet controller and the host is configured to communicate with the embedded device through the second Ethernet controller using only device drivers included with an operating system running on the host Power supply module, the power supply module providing a power supply to the embedded device.

16. The system of claim 15, wherein the communication bus comprises one or more of a Peripheral Component Interconnect (PCI) bus, a PCI extended (PCI-X) bus, and a PCI Express bus.

17. The system of claim 15, wherein the embedded device further comprises:
a. a memory, the memory being coupled with the microprocessor; and
b. one or more Input/Output (I/O) devices, the one or more I/O devices being couple with the microprocessor.

18. The system of claim 15, wherein the embedded device further comprises an Ethernet connector, the Ethernet connector providing a physical connection between the embedded device and an Ethernet network.

19. The system of claim 18, wherein the embedded device is accessible from a remote host on the Ethernet network.

20. The system of claim 15, wherein the microprocessor further comprises one or more applications, wherein the one or more applications are used for communicating with applications running on the host.

21. The system of claim 15, wherein the instrumentation processor comprises a micro-controller.

22. The system of claim 15, wherein the embedded device further comprises a storage medium, the storage medium being capable of storing data.

23. An embedded device for communicating with a host, the embedded device comprising:
a microprocessor, the microprocessor comprising a first Ethernet controller;
an electrical isolation medium;
an interface operable to be physically coupled to a communication bus;
a first Physical layer (PHY), wherein the first PHY is coupled to the first Ethernet controller through a physical transmission medium;
an instrumentation processor, the instrumentation processor collecting information about the host, the instrumentation processor transmitting the information to the microprocessor; and
a second Ethernet controller, the second Ethernet controller comprising a second PHY, where the second PHY is coupled to the first PHY through a physical transmission medium on the embedded device such that the first Ethernet controller, the first PHY the second PHY and the second Ethernet controller form a network on the embedded device, the second Ethernet controller operable to be coupled to a communication bus comprised in the host through an interface physically coupled to the communication bus, wherein the host and the embedded device are electrically isolated from one another by the electrical isolation medium and the host is configured to communicate with the embedded device through the second Ethernet controller using only device drivers included with an operating system running on the host Power supply module, the power supply module providing a power supply to the embedded device.

24. The embedded device of claim 23 further comprising:
c. a memory, the memory being coupled with the microprocessor; and
d. one or more Input/Output (I/O) devices, the one or more I/O devices being coupled with the microprocessor.

25. The embedded device of claim 23 wherein the microprocessor further comprises one or more applications, where the one or more applications are used for communicating with applications running on the host.

26. The embedded device of claim 23 further comprising an Ethernet connector, the Ethernet connector providing a physical connection between the embedded device and an Ethernet network.

27. The embedded device of claim 26 is accessible from a remote host on the Ethernet network.

28. A method of communicating between an application and a host, comprising:
sending a communication from a microprocessor on an embedded device to an application on a host through a communication bus of the host, wherein the embedded device is physically coupled to the communication bus using an interface and the embedded device comprises a first Ethernet controller, a first Physical layer (PHY), coupled to the first Ethernet controller through a physical transmission medium, a second Ethernet controller, the second Ethernet controller comprising a second PHY, wherein the second PHY is coupled to the first PHY through a physical transmission medium on the embedded device such that the first Ethernet controller, the first PHY the second PHY and the second Ethernet controller form a network on the embedded device and the embedded device is physically coupled to the communication bus using an interface, the host and the embedded device are electrically isolated from one another by the electrical isolation medium and the communication bus is couple to the second Ethernet controller and the host is configured to communicate with the embedded device through the second Ethernet controller using only device drivers included with an operating system running on the host; Embedded device further comprising power supply module, the power supply module providing a power supply to the embedded device; and receiving the communication at the application on the host.

29. The method of claim 1, wherein the communication bus comprises one or more of a Peripheral Component Interconnect (PCI) bus, a PCI extended (PCI-X) bus, and a PCI Express bus.

30. The method of claim 1, wherein the embedded device further comprises:

e. a memory, the memory being coupled with the microprocessor; and f. one or more Input/Output (I/O) devices, the one or more I/O devices being couple with the microprocessor.

31. The method of claim 1, wherein the embedded device further comprises an Ethernet connector, the Ethernet connector providing a physical connection between the embedded device and an Ethernet network.

32. The method of claim 4, wherein the embedded device is accessible from a remote host on the Ethernet network.

33. The method of claim 1, wherein the embedded device further comprises an instrumentation processor, the instrumentation processor collecting information about the host, the instrumentation processor transmitting the information to the microprocessor.

34. The method of claim 7, wherein the instrumentation processor comprises a micro-controller.

* * * * *